United States Patent
Sperry et al.

(10) Patent No.: US 6,804,933 B2
(45) Date of Patent: Oct. 19, 2004

(54) APPARATUS AND METHOD FOR FORMING INFLATED CONTAINERS

(75) Inventors: Charles R. Sperry, Northampton, MA (US); Suzanne Scott, Springfield, VT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 10/346,323

(22) Filed: Jan. 17, 2003

(65) Prior Publication Data

US 2003/0106282 A1 Jun. 12, 2003

Related U.S. Application Data

(62) Division of application No. 09/782,766, filed on Feb. 13, 2001, now Pat. No. 6,598,373.

(51) Int. Cl.[7] .............................. B65B 31/00; B65B 9/06
(52) U.S. Cl. ............................. 53/403; 53/79; 53/459; 53/468; 53/469; 53/64; 53/568; 53/284.7; 156/145
(58) Field of Search .......................... 53/403, 79, 459, 53/568, 468, 469, 284.7, 479, 64, 374.3, 374.4; 156/145, 147

(56) References Cited

U.S. PATENT DOCUMENTS

| | | | |
|---|---|---|---|
| 2,265,075 A | | 12/1941 | Knuetter |
| 2,718,105 A | | 9/1955 | Ferguson et al. |
| 3,209,513 A | * | 10/1965 | Cochrane ..................... 53/568 |
| 3,319,538 A | | 5/1967 | Bodolay et al. |
| 3,462,913 A | | 8/1969 | Bodolay et al. |
| 3,596,428 A | | 8/1971 | Young et al. |
| 3,660,189 A | | 5/1972 | Troy |
| 3,938,298 A | | 2/1976 | Luhman et al. |
| 4,096,306 A | * | 6/1978 | Larson ........................ 156/145 |
| 4,169,002 A | | 9/1979 | Larson |
| 4,201,031 A | | 5/1980 | Wiles |
| 4,384,442 A | * | 5/1983 | Pendleton .................... 53/554 |
| 4,448,011 A | | 5/1984 | Pohl |
| 4,512,136 A | | 4/1985 | Christine |
| 4,545,180 A | | 10/1985 | Chung et al. |
| 4,631,901 A | | 12/1986 | Chung et al. |
| 4,654,878 A | | 3/1987 | Lems |
| 4,847,126 A | * | 7/1989 | Yamashiro et al. ......... 428/35.2 |
| 4,869,048 A | | 9/1989 | Boeckmann |
| 4,893,453 A | | 1/1990 | Weikert |
| 5,032,212 A | * | 7/1991 | Campbell .................... 156/466 |
| 5,042,663 A | | 8/1991 | Heinrich |
| 5,070,675 A | | 12/1991 | Chuan-Shiang |
| 5,080,747 A | | 1/1992 | Veix |
| 5,181,365 A | | 1/1993 | Garvey et al. |
| 5,187,917 A | | 2/1993 | Mykleby |
| 5,210,993 A | | 5/1993 | van Boxtel |
| 5,216,868 A | | 6/1993 | Cooper et al. |
| 5,254,074 A | | 10/1993 | Landers et al. |
| 5,337,539 A | | 8/1994 | Barton |
| 5,339,602 A | | 8/1994 | Landers et al. |
| 5,353,573 A | | 10/1994 | Durrant |

(List continued on next page.)

FOREIGN PATENT DOCUMENTS

| | | |
|---|---|---|
| DE | 199 13 408 A1 | 3/1999 |
| DE | 199 13 410 A1 | 3/1999 |
| WO | WO 00/53501 | 3/2000 |
| WO | WO 00/43198 | 7/2000 |
| WO | WO 01/53153 A1 | 7/2001 |
| WO | WO 01/85434 A2 | 11/2001 |

*Primary Examiner*—Stephen F. Gerrity
(74) *Attorney, Agent, or Firm*—Thomas C. Lagaly

(57) ABSTRACT

An apparatus for forming inflated containers generally includes a mechanism that conveys a web of film along a path of travel, the film web including one or more pre-formed flexible containers; an inflation assembly positioned adjacent the travel path to direct gas into the containers, thereby forming inflated containers; and a device for sealing closed each inflated container. Various improvements for more reliably and consistently inflating the containers are also disclosed.

20 Claims, 7 Drawing Sheets

U.S. PATENT DOCUMENTS

| | | |
|---|---|---|
| 5,357,733 A | 10/1994 | Weikert |
| 5,441,345 A | 8/1995 | Garvey et al. |
| 5,454,642 A | 10/1995 | De Luca |
| 5,552,003 A | 9/1996 | Hoover et al. |
| 5,581,983 A | 12/1996 | Murakami |
| 5,687,545 A | 11/1997 | Baker |
| 5,693,163 A | 12/1997 | Hoover et al. |
| 5,699,653 A | 12/1997 | Hartman et al. |
| 5,722,217 A | 3/1998 | Cloud |
| 5,733,045 A | 3/1998 | Jostler et al. |
| 5,755,082 A | 5/1998 | Takahashi et al. |
| 5,824,392 A | 10/1998 | Gotoh et al. |
| 5,845,463 A | 12/1998 | Henaux |
| 5,862,653 A | 1/1999 | Solano |
| 5,873,215 A | 2/1999 | Aquarius et al. |
| 5,875,610 A | 3/1999 | Yuyama et al. |
| 5,918,441 A | 7/1999 | Baker |
| 5,937,614 A | 8/1999 | Watkins et al. |
| 5,942,076 A | 8/1999 | Salerno et al. |
| RE36,501 E | 1/2000 | Hoover et al. |
| 6,035,611 A | 3/2000 | Lerner |
| 6,058,681 A | 5/2000 | Recchia, Jr. |
| RE36,759 E | 7/2000 | Hoover et al. |
| 6,145,273 A | 11/2000 | Baker |
| 6,174,273 B1 | 1/2001 | Harding |
| 6,209,286 B1 * | 4/2001 | Perkins et al. ................ 53/403 |
| 6,375,785 B1 * | 4/2002 | Aquarius .................... 156/252 |
| 6,460,313 B1 * | 10/2002 | Cooper ......................... 53/79 |
| 6,659,150 B1 * | 12/2003 | Perkins et al. ................. 53/79 |

* cited by examiner

APPARATUS AND METHOD FOR FORMING INFLATED CONTAINERS

The present application is a divisional of U.S. Ser. No. 09/782,766 filled Feb. 13, 2001, now U.S. Pat. No. 6,598,373, the benefit of which is claimed under 35 USC Section 120.

BACKGROUND OF THE INVENTION

The present invention relates to inflated containers and, more particularly, to a simplified and improved apparatus and process for producing gas-inflated cushions for packaging.

Various apparatus and methods for forming inflated cushions or pillows are known. Such inflated containers are used to package items, by wrapping the items in the cushions and placing the wrapped items in a shipping carton. The cushions protect the packaged item by absorbing impacts that may otherwise be fully transmitted to the packaged item during transit.

Conventional apparatus for forming inflated cushions tend to be rather large and complex machines, which are expensive and cumbersome to maintain. Further, conventional apparatus often do not reliably inflate the cushions, with some being under-inflated or not inflated at all.

Accordingly, there is a need in the art for a simpler and less expensive apparatus for producing gas-filed packaging cushions, and which more reliably and consistently inflates such cushions.

SUMMARY OF THE INVENTION

Those needs are met by the present invention, which, in one aspect, provides an apparatus for forming inflated containers, comprising:

a. a mechanism that conveys a web of film along a path of travel, the film web comprising a film having a pair of longitudinal side edges and a longitudinal fold to form a longitudinally-folded film web having two juxtaposed film plies with the side edges being positioned adjacent to one another, the folded film web defining
  1) a closed longitudinal edge formed by the longitudinal fold,
  2) an open longitudinal edge positioned opposite and substantially parallel to the closed longitudinal edge, the open longitudinal edge formed from the adjacently-positioned longitudinal side edges, and
  3) one or more pre-formed flexible containers, each of the containers being capable of holding therein a quantity of gas and having
    (a) an open edge for receiving such gas, the open edge being formed by the open longitudinal edge, and
    (b) an opposing closed edge formed by the closed longitudinal edge;

b. an inflation assembly positioned adjacent the travel path and capable of
  1) urging the open longitudinal edge towards the closed longitudinal edge such that a crease forms at the closed edge of each of the pre-formed containers, thereby forming creased, pre-formed containers, and
  2) directing a stream of gas into the open edge of each creased, pre-formed container, thereby forming inflated containers; and c. a device for sealing closed the open edge of each inflated container.

Another aspect of the invention provides method for forming gas-filled cushions, comprising:

a. conveying a web of film along a path of travel, the film web comprising a film having a pair of longitudinal side edges and a longitudinal fold to form a longitudinally-folded film web having two juxtaposed film plies with said side edges being positioned adjacent to one another, the folded film web defining
  1) a closed longitudinal edge formed by the longitudinal fold,
  2) an open longitudinal edge positioned opposite and substantially parallel to the closed longitudinal edge, the open longitudinal edge formed from the adjacently-positioned longitudinal side edges, and
  3) one or more pre-formed flexible containers, each of the containers being capable of holding therein a quantity of gas and having
    (a) an open edge for receiving such gas, the open edge being formed by the open longitudinal edge, and
    (b) an opposing closed edge formed by the closed longitudinal edge;

b. urging the open longitudinal edge towards the closed longitudinal edge such that a crease forms at the closed edge of each of the pre-formed containers, thereby forming creased, pre-formed containers;

c. directing a stream of gas into the open edge of each creased, pre-formed container, thereby forming inflated containers; and d. sealing closed the open end of each inflated container.

The invention further provides an apparatus for forming inflated containers, comprising:

a. a mechanism that conveys a web of film along a path of travel, the film web comprising a series of pre-formed flexible containers, each of the pre-formed containers being capable of holding therein a quantity of gas and having an opening for receiving such gas, the conveying mechanism comprising:
  1) a support structure for a supply of the film web that allows the film web to be withdrawn from the supply,
  2) a pair of adjacent, counter-rotatable cylinders spaced from the film web supply and capable of withdrawing the film web from the film web supply by engaging and moving the film web along the travel path when a portion of the film web passes between the pair of cylinders and the cylinders rotate against the film web, whereby, a moving section of the film web is continuously conveyed from the film web supply and through the pair of cylinders, the moving section of film web being under tension, and
  3) a device for controlling the tension in the moving section of film web;

b. an inflation assembly positioned adjacent the moving section of film web and capable of directing a stream of gas into the opening of each pre-formed container, thereby forming inflated containers; and c. a device for sealing closed the opening of each inflated container.

A related method for forming gas-filled cushions comprises the steps of:

a. conveying a web of film along a path of travel, the film web comprising a series of pre-formed flexible containers, each of the pre-formed containers being capable of holding therein a quantity of gas and having an opening for receiving such gas, the conveying step including the steps of:

1) withdrawing the film web from a supply of the film web with a pair of adjacent, counter-rotatable cylinders spaced from the film web supply, the pair of cylinders engaging and moving the film web along said travel path when a portion of said film web passes between said pair of cylinders and said cylinders rotate against said film web, whereby, a moving section of said film web is continuously conveyed from said film web supply and through the pair of cylinders, the moving section of film web being under tension, and 2) controlling the tension in the moving section of film web;

b. directing a stream of gas into the opening of each pre-formed container, thereby forming inflated containers; and c. sealing closed the opening of each inflated container.

An additional aspect of the invention pertains to an apparatus for forming inflated containers, comprising:

a. a mechanism that conveys a web of film along a path of travel, the film web comprising a film having a pair of longitudinal side edges and a longitudinal fold to form a longitudinally-folded film web having two juxtaposed film plies, each of the juxtaposed film plies having an interior surface disposed in facing relationship with one another and the side edges being positioned adjacent to one another, the folded film web defining 1) a closed longitudinal edge formed by the longitudinal fold, 2) an open longitudinal edge positioned opposite and substantially parallel to the closed longitudinal edge, the open longitudinal edge formed from the adjacently-positioned longitudinal side edges, and 3) one or more pre-formed flexible containers, each of the containers being capable of holding therein a quantity of gas and having (a) an open edge for receiving such gas, the open edge being formed by the open longitudinal edge, and (b) an opposing closed edge formed by the closed longitudinal edge;

b. an inflation assembly positioned adjacent the travel path and capable of directing a stream of gas into the opening of each pre-formed container, wherein one or both of the interior surfaces of the juxtaposed film plies have a degree of surface abrasion sufficient to allow the stream of gas to flow into the open edge of each container, thereby forming inflated containers; and c. a device for sealing closed the opening of each inflated container.

These and other aspects and features of the invention may be better understood with reference to the following description and accompanying drawings.

DETAILED DESCRIPTION OF THE INVENTION

Figure 1:
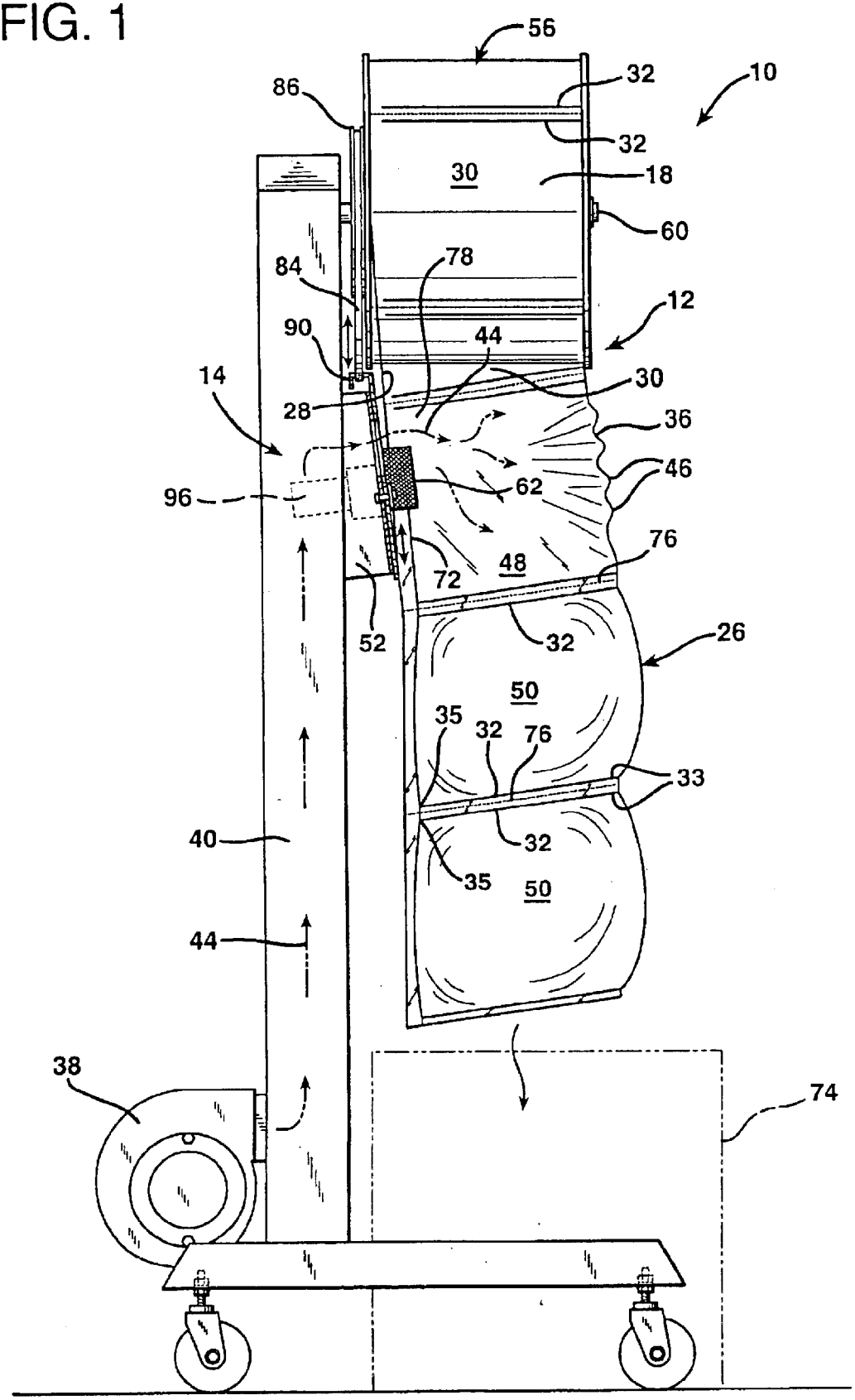
FIG. 1 is a side elevational view of an apparatus for forming inflated containers in accordance with the present invention.
Figure 2:
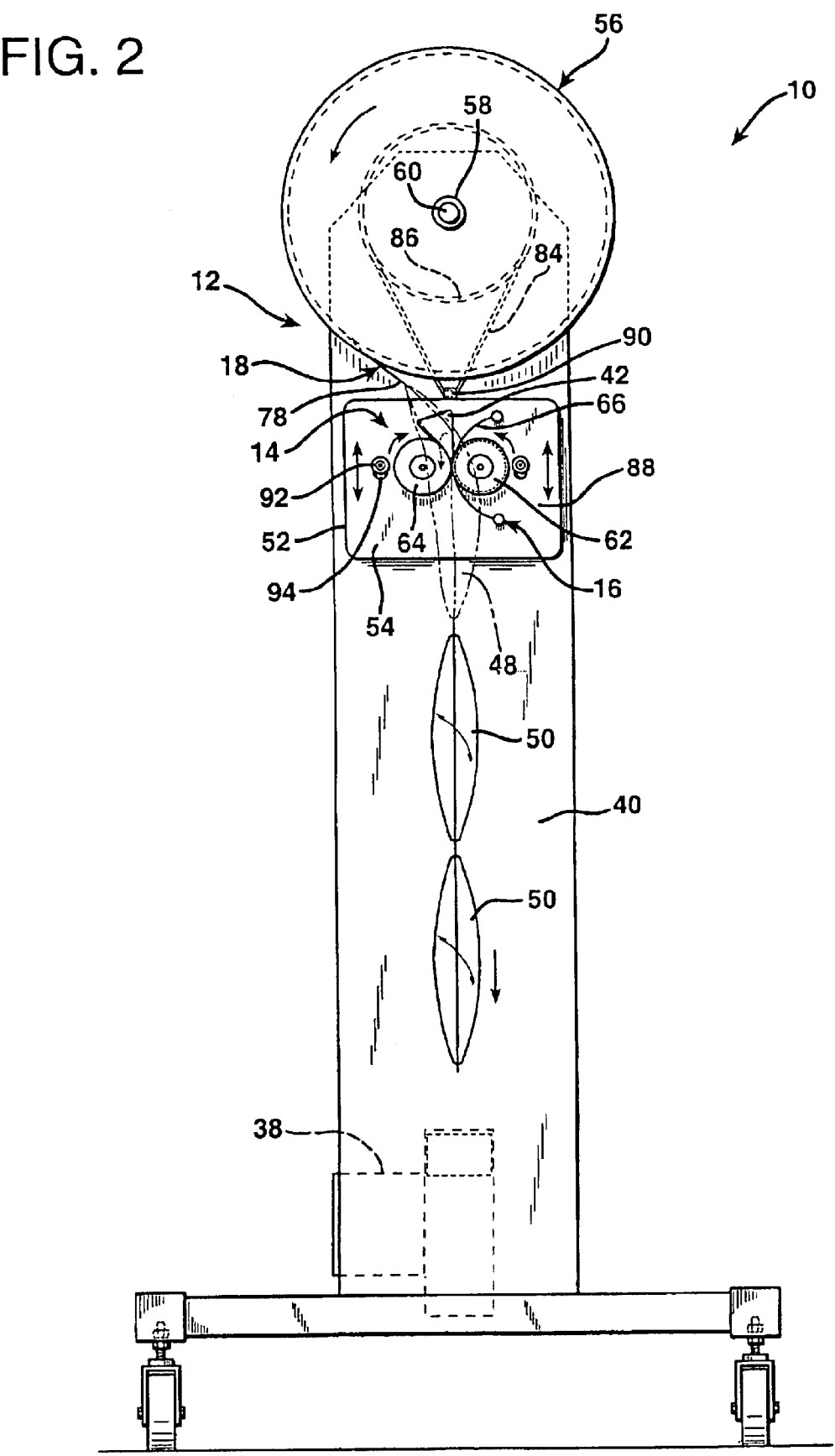
FIG. 2 is a front elevational view of the apparatus shown in FIG. 1.
Figure 3:
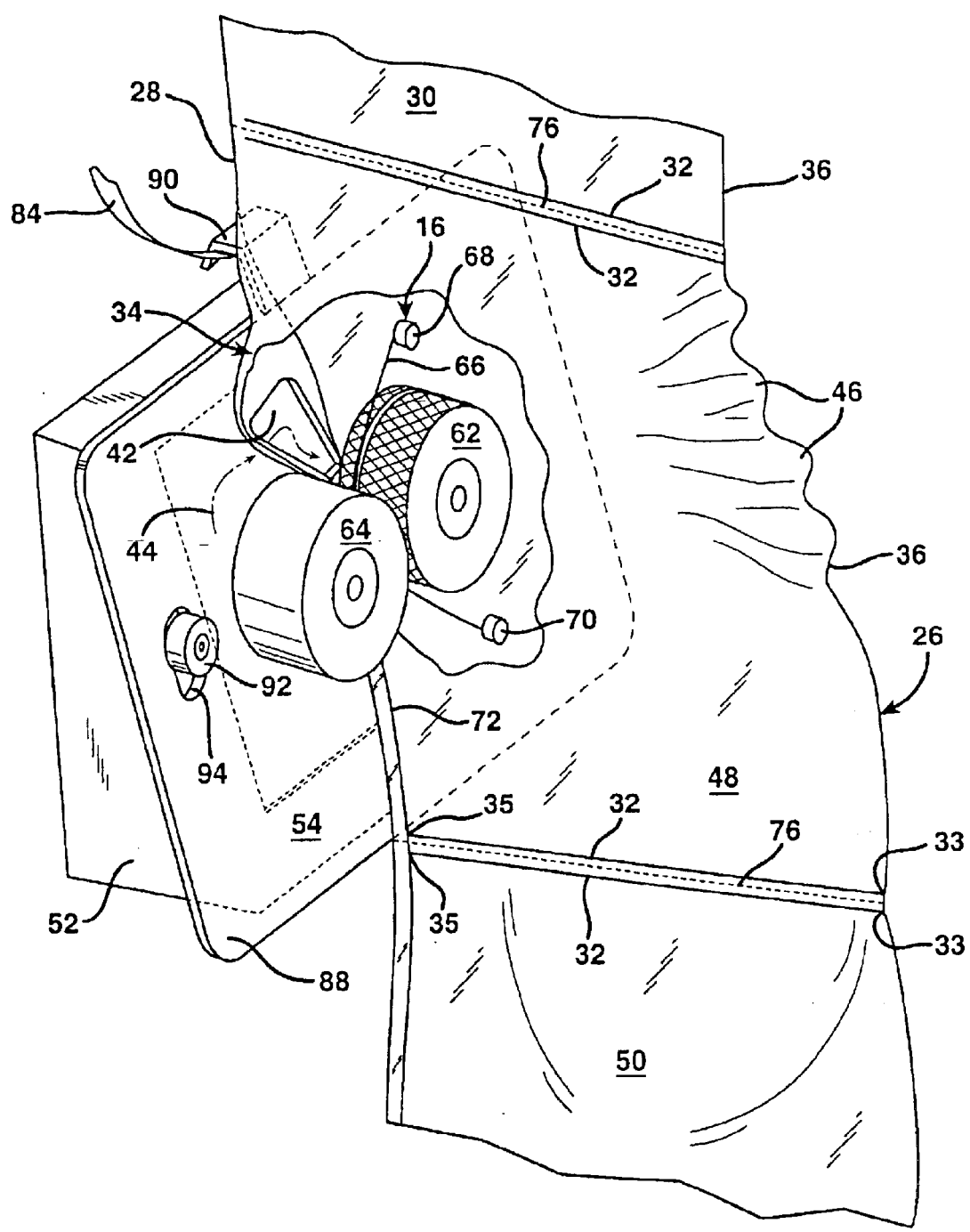
FIG. 3 is perspective view of a portion of the apparatus shown in FIGS. 1–2, illustrating the inflation and sealing of a container.

FIGS. 1 and 2 illustrate an apparatus 10 for forming inflated containers. Apparatus 10 generally includes a conveying mechanism 12, an inflation assembly 14, and a sealing device 16.

Referring collectively to FIGS. 1–4 and 7, conveying mechanism 12 conveys a web of film 18 along a path of travel through apparatus 10 as shown. The "path of travel" (or "travel path") of film web 18 simply refers to the route that the film web traverses while being conveyed through the apparatus 10, as indicated by the shape assumed by the film web due to the manipulation thereof by the below-described conveying mechanism 12 and inflation assembly 14 of apparatus 10.

Film web 18 may, in general, comprise any flexible material that can be manipulated by apparatus 10 and enclose a gas as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known coextrusion process by melting the component polymer(s) and extruding or coextruding them through one or more flat or annular dies.

Figure 7:
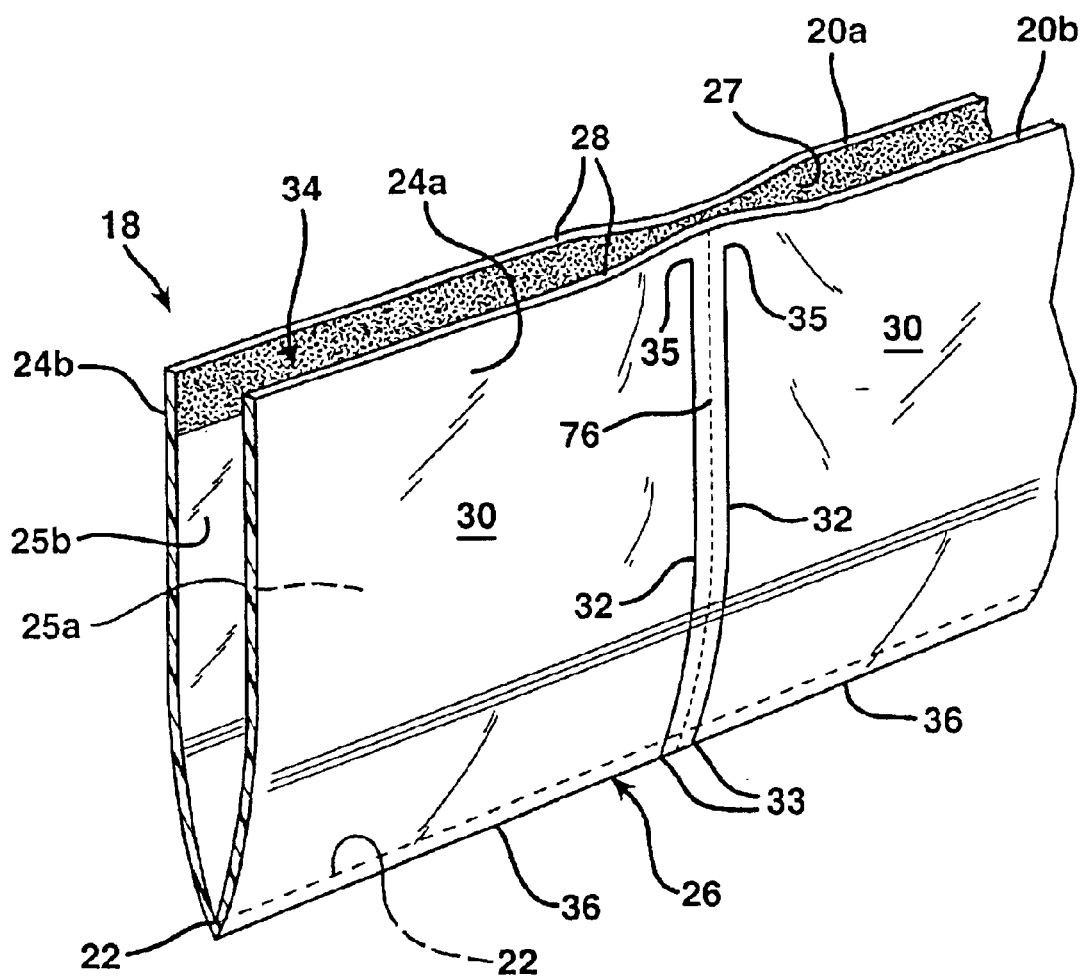
FIG. 7 is a perspective, cross-sectional view of the folded film shown in FIGS. 1–6.

As shown in greater detail in FIG. 7, film web 18 comprises a film having a pair of longitudinal side edges, 20a and 20b, and a longitudinal fold 22 to form a longitudinally-folded film web having two juxtaposed film plies, 24a and 24b, with side edges 20a, b being positioned adjacent to one another and with respective interior surfaces 25a and 25b of juxtaposed film plies 24a, b being disposed in facing relationship with one another. The folded film web 18 thus defines a closed longitudinal edge 26, formed by longitudinal fold 22, and an open longitudinal edge 28. Open longitudinal edge 28 is positioned opposite and substantially parallel to closed longitudinal edge 26, and is formed from adjacently-positioned longitudinal side edges 20a, b. That is, the film is folded longitudinally (i.e., length-wise) such that side edges 20a, b are brought together or at least closer together such that they are adjacent to one another. Thus, the film may be 'center-folded' as shown such that each of film plies 24a, b have substantially the same dimensions and the longitudinal side edges 20a, b are substantially aligned and thus have the same distance from longitudinal fold 22, i.e., the longitudinal fold 22 is located approximately in the center of the width of the film. Alternatively, side edges 20a, b may be off-set if desired, i.e., where the longitudinal fold 22 is not located in the center of the width of the film but is, instead, off-center. As used herein with reference to film web 18, the term "longitudinal" refers to the direction of conveyance of film web 18 through apparatus 10 as indicated in the drawings; "longitudinal" also corresponds to the direction of the length dimension (longest dimension) of film web 18.

By virtue of being folded in this manner, film web 18 defines at least one pre-formed, partially completed container that may be filled with gas, e.g., air, and completed by apparatus 10 to enclose the gas. Preferably, film web 18 includes one or more pre-formed flexible containers 30, e.g., a series of such pre-formed containers, which may be formed by a series of transverse heat seals 32. Each of the heat seals 32 preferably extends from closed longitudinal edge 26 and transversely bonds the juxtaposed film plies 24a, b together such that film web 18 is segregated into a series of pre-formed flexible containers 30 as shown. Preferably, the transverse heat seals 32 each have a first end 33 and a second end 35, with the first end 33 located at closed longitudinal edge 26 and the second end 35 terminating a predetermined distance from open longitudinal edge 28 as shown.

Transverse heat seals 32 may be formed 'in-line' by apparatus 10 or, more preferably, 'off-line,' i.e. prior to loading film web 18 onto apparatus 10.

Each of the pre-formed containers 30 are capable of holding therein a quantity of gas and have an open edge 34 for receiving such gas, as well as an opposing closed edge 36. Open edge 34 of each container 30 is formed by open longitudinal edge 28 of film web 18 while closed edge 36 is formed by closed longitudinal edge 26. Preferably, each container 30 has a longitudinal length, i.e., the distance between the pair of transverse heat seals 32 defining each container, ranging from about 3 to about 10 inches, and more preferably, from about 4 to about 7 inches. If desired, each of the pre-formed containers 30 may include one or more individual channels in which gas may be held.

Referring now to FIGS. 1–4, inflation assembly 14 preferably includes an air blower 38, a plenum housing 40, and an inflation port 42. Air blower 38 generates a stream of air or other gas 44, which is directed through plenum housing 40 and exits the inflation assembly 14 through inflation port 42, preferably at a gas pressure ranging from about 0.25 to about 5 inches H$_2$O over atmospheric pressure (i.e., from about 0.01 to about 0.18 psig). The inventors hereof have determined that, in order for pre-formed containers 30 to fully and reliably inflate with gas from inflation assembly 14, closed edge 36 of each container should be creased, i.e., buckled, as the containers are inflated. This is accomplished in accordance with the present invention by inflation assembly 14, which, in conjunction with conveying mechanism 12, is capable of urging open longitudinal edge 28 of film web 18 towards closed longitudinal edge 26 as the film web is conveyed past inflation port 42. In this manner, at least one crease 46 forms at the closed edge 36 of each of the pre-formed containers 30, thereby sequentially converting each container 30 into a creased, pre-formed container 48 as shown. Stated another way, by urging open longitudinal edge 28 towards closed longitudinal edge 26, closed edge 36 of creased container 48 has a shorter length than that of open edge 34, with the difference in lengths being due to creases 46 in closed edge 36. Such creasing, or differences in edge length, has been found to greatly facilitate the inflation of the containers by air or other gas. Inflation preferably occurs while each container is in a creased position as shown at 48, e.g., just after or simultaneous with the formation of the creases 46.

Inflation port 42 of inflation assembly 14 is positioned adjacent the travel path of film web 18 such that gas stream 44 may be directed into the open edge 34 of each creased, pre-formed container 48, thereby inflating each container. Sealing device 16 seals closed the open edge 34 of each inflated container, thereby forming completed, i.e., inflated and sealed, cushions 50.

In order to urge open longitudinal edge 28 of film web 18 towards closed longitudinal edge 26 to form creased, preformed containers 48, inflation assembly 14 may include a platform 52, which includes an outer surface 54 located immediately adjacent to open longitudinal edge 28 of film web 18 as the film web is conveyed along the travel path. Inflation port 42 is disposed in outer surface 54, and is thereby positioned to direct gas stream 44 into creased containers 48 via the open edge 34 thereof. As shown, outer surface 54 is preferably positioned at an angle relative to closed longitudinal edge 36, i.e., relative to the direction of travel of closed longitudinal edge 36 as film web 18 is conveyed through apparatus 10. Such angle of outer surface 54 serves to direct open longitudinal edge 28 towards the closed longitudinal edge 26 as film web 18 is conveyed past the outer surface.

As discussed in further detail below, film web 18 is preferably provided in the form of a supply roll 56, which may be wound on spool 58 and mounted on shaft 60, which, in turn, is affixed to plenum housing 40. The supply roll 56 is preferably mounted such that film web 18 may be advanced, i.e., unwound, from the roll in a substantially vertical direction as shown. Thus, but for platform 52 and angled outer surface 54, both the closed and open longitudinal edges 26, 28 would extend from supply roll 56 in substantially parallel, vertical directions. Relative to the vertical or other direction in which longitudinal edges 26, 28 would otherwise extend but for platform 52 and angled outer surface 54, outer surface 54 may have any desired angle ranging, e.g., between 0° and 90°, with 0° being vertical (or parallel to the direction in which longitudinal edges 26, 28 would otherwise extend from supply roll 56) and 90° being horizontal (or perpendicular to the direction in which longitudinal edges 26, 28 would otherwise extend from supply roll 56). Preferably, the angle of outer surface 54 ranges between about 1° and about 20° and, more preferably, between about 1° and 10°. For example, outer surface 54 may be angled at 6° from vertical when film web 18 is conveyed in a substantially vertical direction from supply roll 56.

In some embodiments, contact between the open longitudinal edge 28 and angled outer surface 54 may be sufficient to urge the open longitudinal edge towards closed longitudinal edge 26 to an extent necessary to effect or facilitate inflation. More preferably, conveying mechanism 12 includes a pair of adjacent, counter-rotatable cylinders 62 and 64 that are mounted on the angled, outer surface 54 of platform 52. Cylinders 62, 64 are capable of engaging and moving film web 18 along its travel path through apparatus 10 when a portion of the film web passes between the cylinders and the cylinders rotate in the direction indicated in FIG. 2 against the film web. By virtue of being mounted on the angled outer surface 54, cylinders 62, 64 rotate against film web 18 in the same plane as outer surface 54 and, thus, at an angle with respect to closed longitudinal edge 26, i.e., at least with respect to the direction in which the closed longitudinal edge would extend but for the interference/alteration in the movement of film web 18 caused by platform 52 and angled outer surface 54, e.g., the vertical direction. Further, cylinders 62, 64 engage the portion of film web 18 in the vicinity of the open longitudinal edge 28. In this manner, as the counter-rotating cylinders 62, 64 drive the film web 18 through the apparatus as shown, they also have the effect of pushing the open longitudinal edge 28 towards the closed longitudinal edge 26, thereby producing creases 46 to facilitate the inflation of container 48.

When cylinders 62, 64 are utilized in combination with inflation assembly 14 in this fashion, open longitudinal edge 28 of film web 18 may be in contact with outer surface 54, closely spaced therefrom, or a portion of the open longitudinal edge may be in contact with the outer surface 54 while another portion may be spaced from the outer surface as shown. Preferably, that portion of the open longitudinal edge 28 that is immediately adjacent the inflation port 42 is spaced from outer surface 54, and therefore from the inflation port, by a distance of about 1 inch or less and, more preferably, about 0.5 inch or less.

If desired, platform 52 and angled, outer surface 54 may be omitted such that inflation port 42 is disposed in plenum housing 40, or extended therefrom via an appropriate duct or channel, and counter-rotatable cylinders 62, 64 are positioned adjacent the inflation port, wherein the cylinders alone, i.e., without the assistance of angled, outer surface 54, urge the open longitudinal edge 28 towards the closed longitudinal edge 26 to form creases 46, e.g., by being mounted on plenum housing 40 such that the cylinders 62, 64 rotate in a plane that is angled with respect to closed longitudinal edge 26 as explained above. In such an embodiment, the inflation port 42 is located immediately adjacent to the open longitudinal edge 28 as the film web 18 is conveyed along the travel path so that the inflation port can direct the gas stream 44 into the creased, pre-formed containers 48.

The spacing between second end 35 of transverse heat seals 32 and open longitudinal edge 28 has been found to help initiate the inflation of the containers 30 (or 48 when creased) by helping to ensure that the juxtaposed film plies 24a, b remain separated at open longitudinal edge 28, i.e., are not forced together by the force of gas stream 44, when the transverse heat seals 32 move past inflation port 42 as film web 18 is conveyed through apparatus 10. The optimal distance between the second ends 35 of heat seals 32 and open longitudinal edge 28 may be determined by one having ordinary skill in the art without undue experimentation, based on having sufficient distance between ends 35 and edge 28 to provide an 'skirt' that remains open as film web 18 is conveyed past inflation port 42, but not so great a distance that film is wasted (such film between ends 35 and edge 28 do not contribute to the interior volume of completed cushions 50). Such distance may range, for example, from about 0.2 to about 0.6 inch, more preferably from about 0.25 to about 0.5 inch.

Separation of juxtaposed film plies 24a, b during inflation may be further ensured by mechanically abrading one or both interior surfaces 25a, b of the juxtaposed film plies 24a, b. That is, one or both of the interior surfaces 25a and/or 25b preferably has a degree of surface abrasion sufficient to allow gas stream 44 from inflation port 42 to flow into the open edge 34 of each container 30 (or 48 when creased). Such surface abrasion is preferably provided in the form of at least one strip 27 on interior surfaces 25a and/or 25b adjacent to longitudinal side edges 20a and/or 20b (shown in FIG. 7 only on interior surface 25b for clarity). Surface abrasion on interior surfaces 25a and/or 25b has been found to prevent film plies 24a, b from "blocking," i.e., undesirably adhering together, during inflation, which could otherwise prevent inflation of the containers, particularly if film plies 24a, b adhered together at open longitudinal edge 28 (9.e., adjacent longitudinal side edges 20a, b) such that gas pressure from inflation port 42 could not force the film plies open sufficiently to allow gas stream 44 to flow into the open edge 34 of each container. Preferably, interior surfaces 25a and/or 25b are mechanically abraded with an abrasive surface having a surface roughness ranging from about 60 to about 100 grit, e.g., 60–100 grit sandpaper, pressed against the surfaces 25a and/or 25b at a force ranging from about 0.5 to about 5 $lb_f$. For example, when gas stream 44 exits inflation port 42 at a gas pressure of about 1 inch $H_2O$ over atmospheric pressure (0.036 psig), a pair of abraded strips 27 are provided on both interior surfaces 25a, b by bringing such surfaces into contact at about 1 $lb_f$ with an abrasive surface having a surface roughness of about 80 grit. Preferably, abraded strips 27 are applied to interior surfaces 25a and/or 25b prior to forming transverse heat seals 32, and such strips 27 extend below the second end 35 of each heat seal 32. This is preferably done 'off-line' by first center-folding the film web, then passing both folded plies against a pair of planar abrasive surfaces inserted within the film fold to abrade both interior surfaces 25a, b simultaneously, then forming transverse heat seals 32.

When platform 52 and angled, outer surface 54 are employed, it is preferred that sealing device 16 is mounted on such outer surface 54 as shown. Sealing device 16 is preferably located immediately adjacent and slightly 'downstream' of inflation port 42 so that the open edge 34 of each creased container 48 is sealed closed immediately after and/or contemporaneously with the inflation of container 48 by gas stream 44 from inflation port 42. Sealing device 16 preferably seals closed the open edge 34 of each creased container 48 by continuously sealing closed the entire open longitudinal edge 28.

A preferred sealing device is disclosed in commonly-assigned, copending patent application Ser. No. 09/760,105 entitled DEVICE FOR SEALING TWO PLIES OF FILM TOGETHER, PARTICULARLY FOR ENCLOSING A FOAMABLE COMPOSITION IN A FLEXIBLE CONTAINER (Sperry et al.), now U.S. Pat. No. 6,550,229, the disclosure of which is hereby incorporated herein by reference. Such a sealing device, as perhaps best shown in FIG. 3, includes an electrically conductive heating element 66 having a first end secured to a first node 68 and a second end secured to a second node 70. Heating element 66 is positioned between cylinders 62, 64 such that cylinder 62 rotates against the heating element, which is stationary and fixed to outer surface 54 via nodes 68 and 70. Cylinder 62 preferably includes a circumferential groove in which heating element 66 'rides' as cylinder 62 rotates against the heating element 66.

The opening edge 34 of each creased container 48 is sealed closed when conveying mechanism 12 brings film web 18 into moving contact with heating element 66 between cylinders 62, 64 and sufficient current is caused to flow through the heating element that it (i.e., the heating element 66) heats to a sealing temperature sufficient to form longitudinal heat seal 72 between juxtaposed film plies 24a and 24b of film web 18. Longitudinal heat seal 72 seals closed the open longitudinal edge 28 of film web 18 and also intersects each of the transverse heat seals 32 as shown, preferably at second ends 35 thereof. In this manner, the open edge 34 of each creased container 48 is sealed closed, after gas 44 has been directed into such containers by inflation assembly 14, thereby trapping, i.e., enclosing, gas 44 within each container, resulting in the formation of completed cushions 50.

When film web 18 is formed from a thermoplastic film, the sealing temperature necessary to form longitudinal heat-seal 72 is that which causes the film plies 24a, b to weld or fuse together by becoming temporarily fully or partially molten in the area of contact with the heating element 66. Such temperature, i.e., the "sealing temperature," may readily be determined by those of ordinary skill in the art without undue experimentation for a given application based on, e.g., the composition and thickness of the film plies to be sealed, the speed at which the film plies move against the heating element, and the pressure at which the film plies and heating element are urged together between cylinders 62, 64. As an example, when film web 18 comprises polyethylene-based film ranging in thickness from about 0.001 to about 0.003 inch (for a combined, juxtaposed thickness ranging from 0.002 to 0.006 inch when the film plies 24a, b are folded as shown), the sealing temperature to which heating element 66 is heated preferably ranges from about 300 to about 500° F.

Heating element 66 may be any device capable of heating to a predetermined temperature sufficient to heat-seal film plies 24a, b together. Suitable types of devices for heating element 66 include one or more wires comprising metal and/or other electrically conductive materials; one or more ribbons comprising metal; circuit-printed plastic ribbons, e.g., metal printed on a plastic substrate comprising polyethylene terephthalate (PET); and other suitable electrically conductive devices.

The drawings illustrate heating element 66 in the form of a wire. When heating element 66 assumes such a form, the wire may have any desired cross-sectional shape, including round, square, oval, rectangular, etc.

An alternative sealing device which may be used in the apparatus 10 in accordance with the present invention employs a heating element that is completely wrapped about the outer circumference of a cylinder, as disclosed in the above-incorporated U.S. Pat. No. 5,376,219. As a further alternative to employing the sealing device 16 as described above, one or both of film plies 24a, b may include strips of a bonding material located at or adjacent to longitudinal side edges 20a and/or 20b of film web 18. Such a bonding material, e.g., an adhesive or cohesive material, forms a longitudinal seal similar to seal 72 when the film plies 24a, b are pressed together between cylinders 62, 64. Further details concerning this means for sealing two film plies together are described in copending U.S. Ser. No. 09/591,830, filed Jun. 12, 2000 and entitled METHOD FOR ENCLOSING A FOAMABLE COMPOSITION IN A FLEXIBLE BAG (Oberle et al.), the disclosure of which is hereby incorporated herein by reference (now abandoned but published as EP 1 163 990).

The completed cushions 50 may be collected in a basket or other suitable container, schematically represented at 74 in FIG. 1, until needed for use. Preferably, each of the cushions 30 are manually detachable from film web 18, and therefore each completed cushion 50 is manually detachable from adjacent completed cushions 50, along one or more transverse lines of weakness 76. As shown, transverse lines of weakness 76 preferably extend from closed longitudinal edge 26 to open longitudinal edge 28, and are positioned between transverse heat seals 32 from adjacent pre-formed containers.

The inventors hereof have determined that a further important component of proper cushion inflation is control of the tension in that portion of film web 18 that is conveyed past inflation port 42, i.e., the section of film web 18 that is in motion between supply roll 56 and cylinders 62, 64. If the tension in such section of film web 18 is too high, the pre-formed containers 30 cannot fully inflate or, in extreme cases, cannot be inflated to any significant extent. On the other hand, if the tension in that section of film web 18 is too low, the film web does not track properly through apparatus 10, e.g., the web travels out of the 'nip' between cylinders 62, 64 or the film plies 24a, b do not remain consistently or continually open at open longitudinal edge 28, thereby preventing a complete or uniform degree of inflation of containers 30.

Conveying mechanism 12 preferably includes a support structure for a supply of film web 18 that allows the film web to be withdrawn from such supply. As discussed briefly above, a preferred film web supply is supply roll 56, wherein a roll of film web 18 is wrapped about spool 58, and a preferred support structure for the supply roll is shaft 60 mounted to plenum housing 40. Supply roll 56 rotates on or with shaft 60 when film web 18 is withdrawn from the supply roll. That is, shaft 60 may remain stationary while supply roll 56 rotates thereon or, as an alternative, spool 58 may be non-rotatably secured to shaft 60, with shaft 60 being rotatably mounted to plenum housing 40.

Adjacent, counter-rotatable cylinders 62, 64 are spaced from supply roll 56 and capable of withdrawing film web 18 from the supply roll by engaging and moving the film web when a portion of the film web passes between the cylinders, and the cylinders rotate against the film web. This withdrawal of film web 18 by cylinders 62, 64 exerts a tensioning force on the film web, which pulls the film web from the supply roll 56. As a result, a moving section 78 of film web 18 is continuously conveyed from supply roll 56 and through the cylinders 62, 64 when the cylinders withdraw the film web from supply roll 56. As perhaps most clearly delineated in FIG. 5, moving section 78 is that portion of film web 18 that has been withdrawn from supply roll 56 and is in motion towards adjacent cylinders 62, 64 at any given time while film web 18 is being conveyed along its travel path through apparatus 10. Such moving section 78 of film web 18 is under tension as a result of being pulled from supply roll 56 by cylinders 62, 64. The inventors hereof have determined, however, that such tension has a propensity to vary as the amount of film web 18 contained on supply roll 56 depletes.

Figure 5:
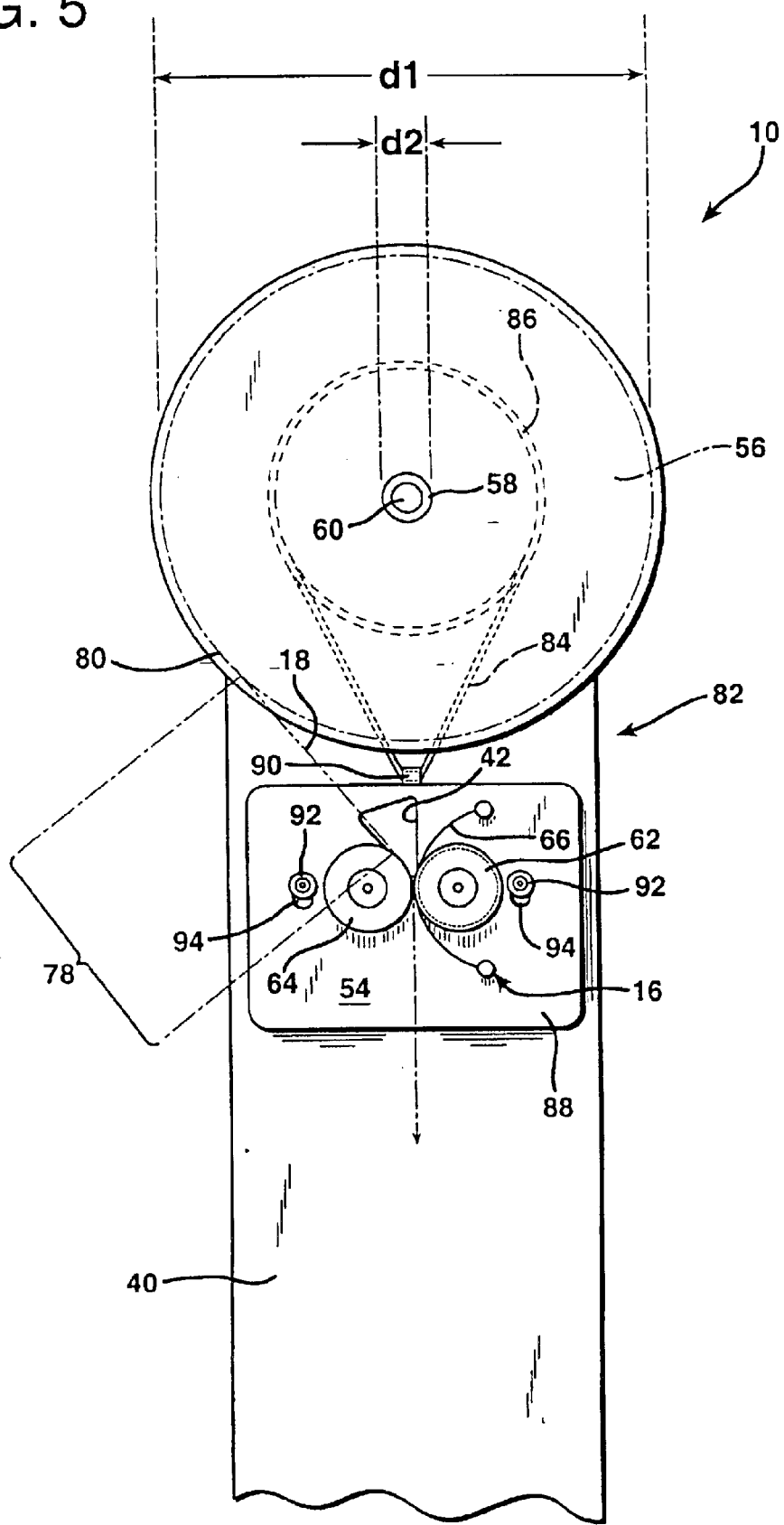
FIG. 5 is similar to FIG. 2 and illustrates full (d1) and depleted (d2) supply roll diameters.
Figure 6:
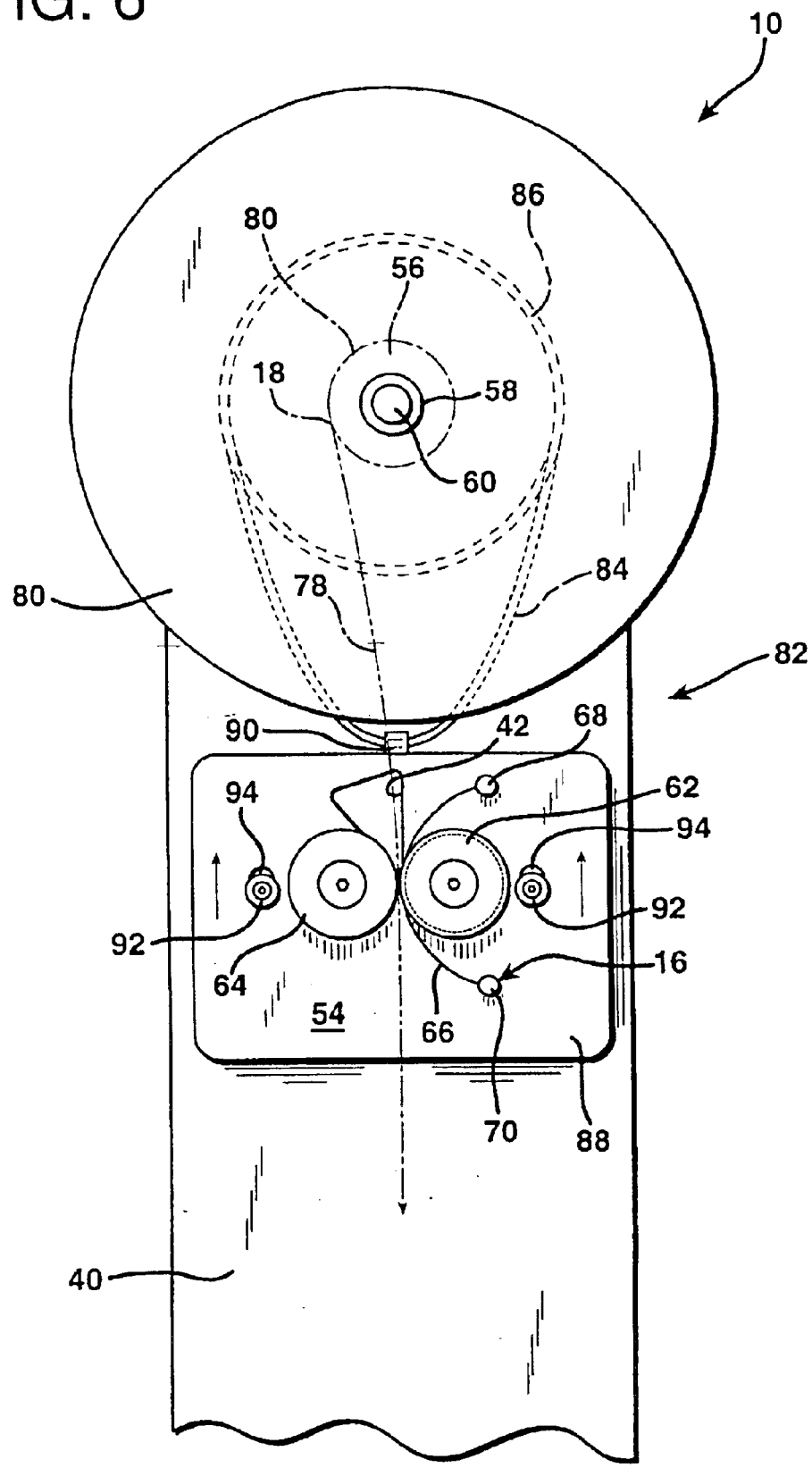
FIG. 6 illustrates the apparatus of FIG. 5 but with the supply roll in a nearly depleted state.

Specifically, with reference to FIG. 5, when the supply roll 56 is 'full,' i.e., contains the maximum amount of film web 18 that will be accommodated by the roll, the diameter of film web 18 contained on the supply roll is "d1" (film web 18 is shown in phantom in FIGS. 5 and 6 for clarity). Just prior to the depletion of the supply of film web 18 on supply roll 56, the diameter of the roll is "d2," the minimum diameter of the supply roll. When the diameter of the supply roll is at the maximum diameter d1, the force required to withdraw the film web from the roll is at a minimum because the distance between the outer circumference 80 of supply roll 56 and shaft 60 is at a maximum, and therefore maximum leverage exists between the outer circumference 80 and shaft 60. For the same reason, the force required to withdraw the film web 18 from supply roll 56 is at a maximum when the supply of film web has been nearly depleted such that the diameter of the roll is at d2. Thus, the tension in moving section 78 of film web 18 is at a minimum when the supply roll is full, i.e., has diameter d1, and such tension in moving section 78 gradually increases as the film web supply is depleted, i.e., as the diameter of the supply roll decreases towards d2.

This change in the tension in moving section 78 makes it difficult to properly and reproducibly inflate each of the pre-formed containers 30 that are defined in supply roll 56. If the tension in moving section 78 is optimized to achieve proper inflation of the containers 30 when supply roll 56 is full (diameter d1), such tension would gradually increase as the supply roll 56 depletes to a point where the tension would be too great to allow the containers to be inflated. On the other hand, if the tension were optimized based on the force required to withdraw film web 18 when the supply roll was near depletion (diameter d2), the tension in moving section 78 would be too low when the supply roll 56 is full or nearly so such that film web 18 would not track properly to allow inflation of containers 30 while being conveyed through apparatus 10.

In accordance with the practice of the present invention, therefore, a device 82 is preferably provided for controlling the tension in the moving section 78 of film web 18 between supply roll 56 and cylinders 62, 64. More specifically, tension-control device 82 reduces the variation in tension in moving section 78 such that the tension in section 78 remains substantially constant from the initial withdrawal of film web 18 from a full supply roll 56 when it is full (diameter d1), and through the depletion of such supply roll (diameter d2).

Tension-control device 82 preferably includes a frictional member 84 that is frictionally engageable with supply roll 56, i.e., capable of applying to supply roll 56 a frictional force that opposes the rotation of the supply roll. Frictional member 84 may take the form of a band, wire, arm that is biased against supply roll 56, or any other element that acts as a brake against the rotation of supply roll 56. The frictional member may be frictionally engageable with supply roll 56 either directly or indirectly, i.e., it may contact the supply roll directly or may contact an auxiliary component that is associated with the supply roll and rotationally coupled thereto. As perhaps best illustrated in FIG. 4, frictional member 84 is preferably in the form of a stationary band, e.g., constructed from stainless steel and having a width of about 0.5 inch, that is in frictional contact with friction wheel 86. Friction wheel 86 is, in turn, rotationally coupled to supply roll 56 such that supply roll 56 cannot rotate on shaft 60 without also causing friction wheel 86 to rotate. Friction wheel preferably has a diameter ranging from about 2 to about 8 inches, more preferably from about 3 to about 5 inches, and may be constructed of polycarbonate. Frictional member 84 thus acts as a brake or drag against the rotation of friction wheel 86, and therefore also against the rotation of supply roll 56, particularly when a weighted object is suspended from the frictional member or the frictional member 84 is otherwise biased away from friction wheel 86, e.g., with a spring, in order to increase the frictional force applied against the wheel 86 by frictional member 84.

Preferably, the tension-control device 82 also includes some means for varying the frictional force applied to supply roll 56 by the frictional member 84 in response to changes in the tension in moving section 78 of film web 18. Such means may include a movable base 88 upon which cylinder pair 62, 64 are mounted. The movable base 88 is movable towards and away from supply roll 56, and also attachable to friction member 84, e.g., via hook 90, such that movement of the movable base 88 towards supply roll 56 causes a decrease in the frictional force applied to the supply roll by frictional member 84. That is, the movable base 88 with cylinders 62, 64 mounted thereon has a weight ranging from, e.g., about 1–10 pounds, and is suspended from friction member 84 via hook 90. This weight thus causes frictional member 84 to exert a frictional force against the rotation of friction wheel 86 and, coupled thereto, supply roll 56. When the base 88 is caused to move towards supply roll 56, the amount of frictional force against the rotation of the supply roll decreases.

When the full weight of movable base 88 is suspended from frictional member 84, as shown in FIG. 5, the resultant frictional force against the rotation of supply roll 56 will be at a maximum. This additional frictional force increases the force required to withdraw film web 18 from supply roll 56 (i.e., in addition to the force normally required to withdraw the film web notwithstanding the effects of frictional member 84), thereby increasing the tension in moving section 78 to the maximum extent. If necessary or desired to increase the tension in moving section 78, additional weight may be added to movable base 88 or movable base 88 may be biased away from supply roll 56, e.g., via opposing spring tension.

As shown in FIG. 6, when movable base 88 moves towards supply roll 56, the friction-induced increase in tension in moving section 78 decreases, as less of the weight of the movable base pulls on frictional member 84, thereby allowing the friction member 84 to be more slack and contact friction wheel 86 with less frictional force in comparison to the more taught/higher frictional contact state of the friction member 84 as shown in FIG. 5.

Accordingly, when supply roll 56 is full (diameter d1), the force otherwise required to withdraw film web 18 from the supply roll is at a minimum as explained above. However, when supply roll 56 is full, the movable base 88 is preferably at it lowest point (i.e., farthest away from supply roll 56) such that the maximum amount of frictional force is applied against the rotation of supply roll 56 and, therefore, the friction-induced increase in tension in moving section 78 is at a maximum.

As the supply roll 56 begins to deplete, the diameter decreases from d1 to d2 and the force required to withdraw film web 18 from the supply roll increases, which would otherwise result in an increase in the tension in moving section 78 of film web 18. However, such increase in tension does not occur in accordance with the present invention. As the tension begins to increase in moving section 78, i.e., when the force required to withdraw film web 18 from supply roll 56 increases as the supply of film web 18 and, therefore, the diameter of the supply roll, decreases, the increase in tension in moving section 78 causes cylinders 62, 64 to exert a greater pulling or tensile force on film web 18 and this, in turn, causes movable base 88 to move towards supply roll 56 as illustrated in FIG. 6, thereby decreasing the frictional force applied to the supply roll by frictional member 84 so that the tension in moving section 78 decreases. Thus, the decrease in tension in moving section 78 caused by the movement of movable base 88 towards supply roll 56 offsets the increase in tension in such section as caused by the depletion of the supply of film web 18 on supply roll 56. As a result, the tension in moving section 78 remains sufficiently consistent to allow reliable and reproducible inflation of pre-formed containers 30, regardless of whether the diameter of supply roll 56 is at d1, d2, or anywhere in between. In this manner, the tension in moving section 78 may be controlled, e.g., to remain within the range of 2 to 4 $lb_f$.

Preferably, movable base 88 is movably mounted to platform 52 such that movable base 88 provides outer surface 54 as shown, with cylinders 62, 64 and sealing device 16 being affixed to movable base 88 at outer surface 54. Movable base 88 may be mounted to platform 52 with a pair of retaining pins 92, which pass through slots 94 in the movable base and are attached to platform 52. Slots 94 are shaped to allow the movable base to move both towards and away from supply roll 56.

Inflation port 42 preferably extends through movable base 88 and is disposed in outer surface 54. Both platform 52 and movable base 88, as well as outer surface 54, are preferably positioned at an angle, relative to closed longitudinal edge 26 of film web 18, in order to direct the open longitudinal edge 28 towards the closed longitudinal edge as film web 18 is conveyed past inflation port 42 by cylinders 62, 64, to thereby form creased containers 48 as discussed above. Cylinders 62, 64 are preferably mounted on the angled, outer surface 54 adjacent to inflation port 42 as shown.

Moving section 78 of film web 18 preferably extends across at least a portion of inflation port 42. This is preferred since the tension in moving section 78 is controlled as discussed above, and therefore inflation of containers 30, and most preferably creased containers 48, occurs in this section of film web 18.

Inflation port 42 is preferably shaped such that film web 18, preferably moving section 78 thereof, continuously extends across at least a portion of the inflation port as the travel path of film web changes, which occurs as the supply of film web 18 on supply roll 56 is depleted. For example, as illustrated, inflation port 42 has a wedge or pie shape that is sufficiently wide so that film web 18 extends across the inflation port when supply roll 56 is full, i.e., at diameter d1 (FIG. 5), when the supply roll is empty (diameter d2, FIG. 6), and at all diameters in between d1 and d2.

Figure 4:
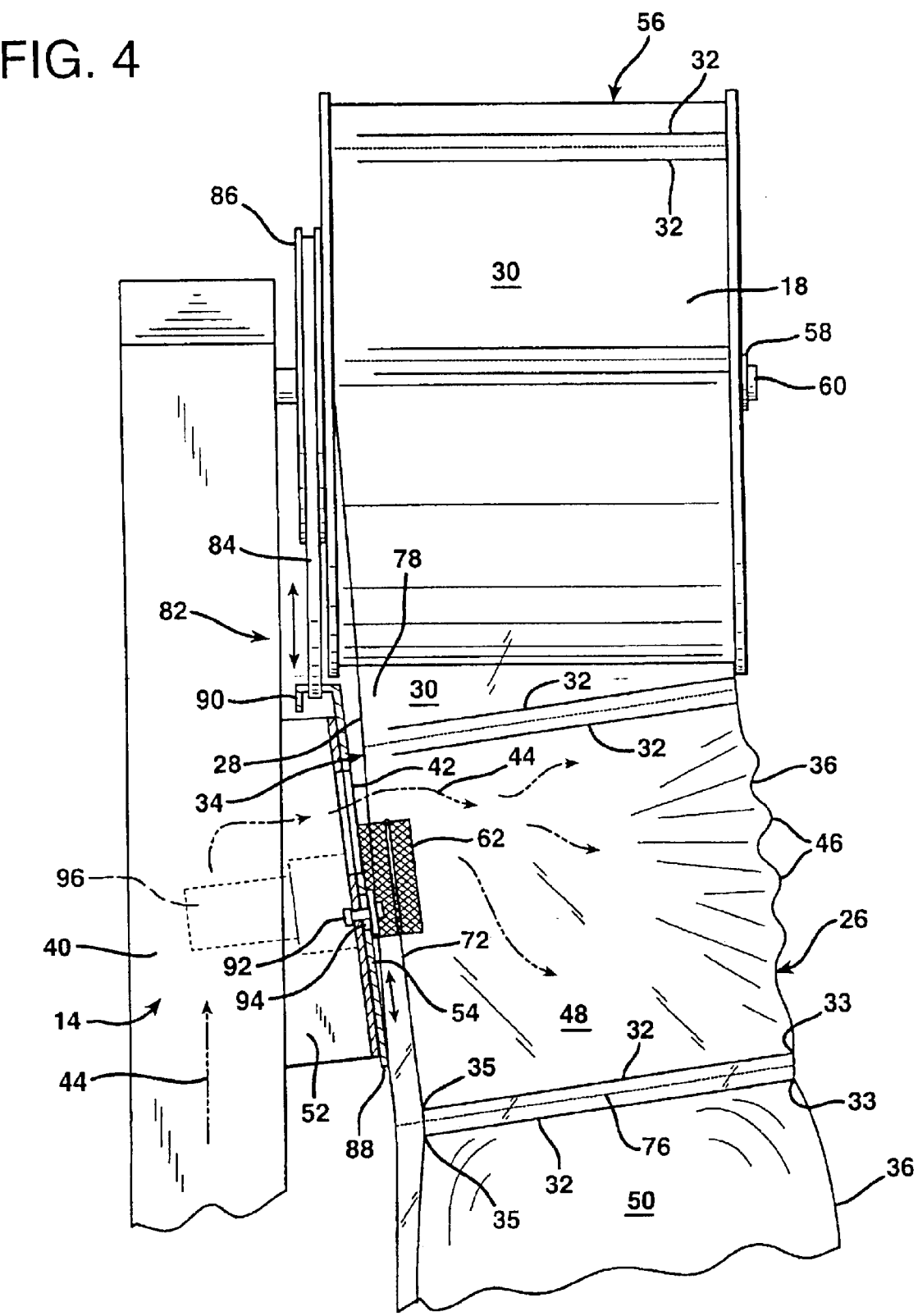
FIG. 4 is a sectional view of the apparatus shown in FIG. 1, illustrating in greater detail the inflation and sealing of a container, with a retaining pin being shown in the foreground.

One or both cylinders 62, 64 are preferably coupled to an electrical, hydraulic, or pneumatic motor, represented schematically at 96 in FIG. 4, having a rotational output to cause the cylinders to rotate. For example a single motor, such as an electrical "gear head" motor, may be axially coupled to cylinder 62, which causes cylinder 62 to rotate when power (e.g., electricity) is supplied to the motor. When cylinder 62 is positioned in abutting relationship with cylinder 64 as shown, the rotation of cylinder 62 causes cylinder 64 to rotate. Alternatively, motor 96 could be coupled instead to cylinder 64 or, as a further alternative, separate drive motors could be coupled to each of cylinders 62, 64.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A method for forming inflated containers, comprising:
   a. conveying a web of film along a path of travel, said film web comprising a series of pre-formed flexible containers, each of said pre-formed containers being capable of holding therein a quantity of gas and having an opening for receiving such gas, said conveying step including the steps of:
      1) withdrawing said film web from a rotatable supply roll of said film web with a pair of adjacent, counter-rotatable cylinders spaced from said film web supply, said pair of cylinders engaging and moving said film web along said travel path when a portion of said film web passes between said pair of cylinders and said cylinders rotate against said film web, whereby, a moving section of said film web is continuously conveyed from said supply roll and through said pair of cylinders, said moving section of film web being under tension, and
      2) controlling the tension in said moving section of film web by
         (a) applying to said supply roll a frictional force that opposes the rotation of said supply roll, and
         (b) varying the frictional force applied to said supply roll in response to changes in the tension in said moving section of film web being conveyed from said supply roll and through said pair of cylinders;
   b. directing a stream of gas into the opening of each pre-formed container in said moving section of film web between said supply roll and said pair of cylinders, thereby forming inflated containers: and
   c. sealing closed the opening of each inflated container.

2. An apparatus for forming inflated containers, comprising:
   a. a mechanism that conveys a web of film along a path of travel, said film web comprising a series of pre-formed flexible containers, each of said pre-formed containers being capable of holding therein a quantity of gas and having an opening for receiving such gas, said conveying mechanism comprising:
      1) a film web supply, comprising a supply roll of said film web wrapped about a spool and mounted on a support structure, said supply roll rotating on or with said support structure when said film web is withdrawn from said supply roll,
      2) a pair of adjacent, counter-rotatable cylinders spaced from said film web supply and capable of withdrawing said film web from said film web supply by engaging and moving said film web along said travel path when a portion of said film web passes between said pair of cylinders and said cylinders rotate against said film web, whereby, a moving section of said film web is continuously conveyed from said film web supply and through said pair of cylinders, said moving section of film web being under tension, and
      3) a device for controlling the tension in said moving section of film web, said tension-controlling device comprising
         (a) a frictional member that is capable of applying a frictional force that opposes the rotation of said supply roll, and
         (b) means for varying the frictional force applied by said frictional member in response to changes in the tension in said moving section of film web;
   b. an inflation assembly positioned adjacent said moving section of film web and between said film web supply and said pair of cylinders, said inflation assembly capable of directing a stream of gas into the opening of each pre-formed container, thereby forming inflated containers; and
   c. a device for sealing closed the opening of each inflated container.

3. The apparatus of claim 2, wherein said means for varying the frictional force applied by said frictional member comprises a movable base upon which said pair of cylinders are mounted, said movable base being movable towards said supply roll and attachable to said frictional member such that movement of said movable base towards said supply roll causes a decrease in the frictional force applied by said frictional member, whereby, when the tension increases in said moving section of film web being conveyed from said supply roll and through said pair of cylinders, said pair of cylinders cause said movable base to move towards said supply roll, thereby decreasing the frictional force applied by said frictional member so that the tension in said moving section decreases.

4. The apparatus of claim 3 wherein:
  a. said film web comprises
    1) juxtaposed film plies,
    2) a closed longitudinal edge at which longitudinal side edges of said juxtaposed film piles are joined, and
    3) an open longitudinal edge positioned opposite said closed longitudinal edge, said open longitudinal edge formed from adjacently-positioned longitudinal side edges of said juxtaposed film plies;
  b. each of said pre-formed flexible containers include
    1) an open edge formed by said open longitudinal edge, said open edge providing said opening for receiving a gas, and
    2) an opposing closed edge formed by said closed longitudinal edge; and
  c. said inflation assembly is capable of urging said open longitudinal edge towards said closed longitudinal edge such that a crease forms at the closed edge of each of said pre-formed containers, thereby forming creased, pre-formed containers, into which said stream of gas is directed via said openings.

5. The apparatus of claim 4, wherein:
  a. said inflation assembly includes a platform comprising an inflation port from which said stream of gas exits said inflation assembly and is directed into said creased, pre-formed containers;
  b. said movable base is movably mounted to said platform, said movable base having an outer surface located immediately adjacent to said open longitudinal edge as said film web is conveyed along said travel path;
  c. said inflation port extends through said movable base and is disposed in said outer surface; and
  d. said outer surface of said movable base is positioned at an angle, relative to said closed longitudinal edge, which directs said open longitudinal edge towards said closed longitudinal edge as said film web is conveyed past said inflation assembly.

6. The apparatus of claim 5, wherein said pair of cylinders are mounted on said angled, outer surface of said movable base adjacent to said inflation port.

7. The apparatus of claim 4, wherein
  a. said inflation assembly comprises an inflation port disposed in said movable base and located immediately adjacent to said open longitudinal edge as said film web is conveyed along said travel path so that said inflation port can direct said stream of gas into said creased, pre-formed containers; and
  b. said pair of adjacent, counter-rotatable cylinders are adapted to engage therebetween said open longitudinal edge and urge said open longitudinal edge towards said closed longitudinal edge, said cylinders positioned adjacent to said inflation port.

8. The apparatus of claim 4, wherein said film web includes a series of transverse heat seals extending from said closed longitudinal edge and bonding said juxtaposed film plies together such that said film web is segregated into said series of pre-formed flexible containers.

9. The apparatus of claim 8, wherein said transverse heat seals each have a first end and a second end, said first end located at said closed longitudinal edge and said second end terminating a predetermined distance from said open longitudinal edge.

10. The apparatus of claim 8, wherein said device for sealing closed said open longitudinal edge is adapted to form a longitudinal heat seal that bonds said juxtaposed film plies together and intersects each of said transverse heat seals.

11. The apparatus of claim 4, wherein said juxtaposed piles of said film web each have an interior surface disposed in facing relationship with one another, one or both of said interior surfaces having a degree of surface abrasion sufficient to allow said stream of gas from said inflation assembly to flow into the open edge of each container.

12. The apparatus of claim 3, wherein said device for sealing closed the opening of each inflated container is mounted on said movable base.

13. The apparatus of claim 2, wherein
  a. said inflation assembly includes an inflation port from which said stream of gas exits said inflation assembly and is directed into said pre-formed containers; and
  b. said moving section of film web that is conveyed from said supply roll and through said pair of cylinders extends across at least a portion of said inflation port.

14. The apparatus of 13, wherein
  a. said film web supply roll has a diameter, said diameter being determined by the amount of film web contained in said supply roll and, as said film web is withdrawn from said supply roll, said diameter decreases such that the travel path of said film web changes; and
  b. said inflation port is shaped such that said film web continuously extends across at least a portion of said inflation port as the travel path of said film web changes.

15. The apparatus of claim 2, wherein said pre-formed containers are manually detachable from said film web along one or more transverse lines of weakness.

16. The apparatus of claim 15, wherein said film web has a closed longitudinal edge and an opposing open longitudinal edge, and wherein said transverse lines of weakness extend from said closed longitudinal edge to said open longitudinal edge and are positioned between transverse heat seals from adjacent pre-formed containers.

17. An apparatus for forming inflated containers, comprising:
  a. a mechanism that conveys a web of film along a path of travel, said film web comprising a series of pre-formed flexible containers, each of said pre-formed containers being capable of holding therein a quantity of gas and having an opening for receiving such gas, said conveying mechanism comprising:
    1) a film web supply, comprising a supply roll of said film web wrapped about a spool and mounted on a support structure, said supply roll rotating on or with said support structure when said film web is withdrawn from said supply roll,
    2) a pair of adjacent, counter-rotatable cylinders spaced from said film web supply and capable of withdrawing said film web from said film web supply by engaging and moving said film web along said travel path when a portion of said film web passes between said pair of cylinders and said cylinders rotate against said film web, whereby, a moving section of said film web is continuously conveyed from said film web supply and through said pair of cylinders, said moving section of film web being under tension, and 3) a device for controlling the tension in said moving section of film web, said tension-controlling device comprising (a) a frictional member that is capable of applying a frictional force that opposes the rotation of said supply roll, and (b) means for varying the frictional force applied by said frictional member in response to changes in the tension in said moving section of film web, said means comprising a movable base upon which said pair of cylinders are mounted, said movable base being movable towards said supply roll and attachable to said friction member such that movement of said movable base towards said supply roll causes a decrease in the frictional force applied by said frictional member;

b. an inflation assembly positioned adjacent said moving section of film web and capable of directing a stream of gas into the opening of each pre-formed container, thereby forming inflated containers; and c. a device for sealing closed the opening of each inflated container.

18. The apparatus of claim 17, wherein said film web has a closed longitudinal edge and an opposing open longitudinal edge, and wherein said movable base is positioned at an angle, relative to said closed longitudinal edge, which directs said open longitudinal edge towards said closed longitudinal edge as said film web is conveyed past said inflation assembly.

19. The apparatus of claim 17, wherein a. said film web has a closed longitudinal edge and an opposing open longitudinal edge;

b. said inflation assembly comprises an inflation port disposed in said movable base and located immediately adjacent said open longitudinal edge as said film web is conveyed along said travel path so that said inflation port can direct said stream of gas into said pre-formed containers; and c. said pair of adjacent, counter-rotatable cylinders are adapted to engage therebetween said open longitudinal edge and urge said open longitudinal edge towards said closed longitudinal edge, said cylinders positioned adjacent said inflation port.

20. The apparatus of claim 17, wherein said device for sealing closed the opening of each inflated container is mounted on said movable base.

* * * * *